UNITED STATES PATENT OFFICE.

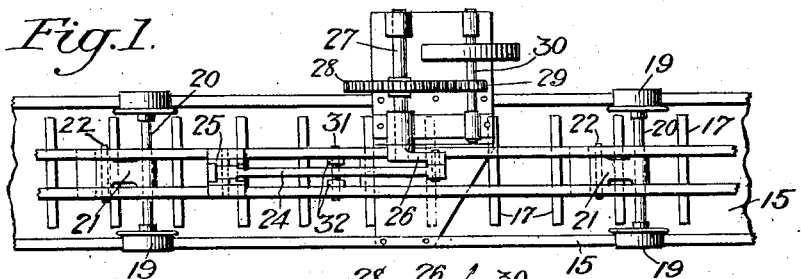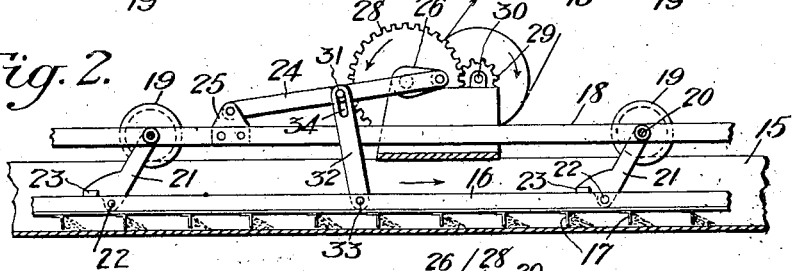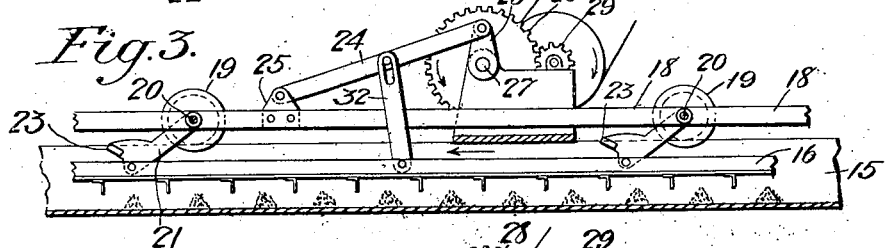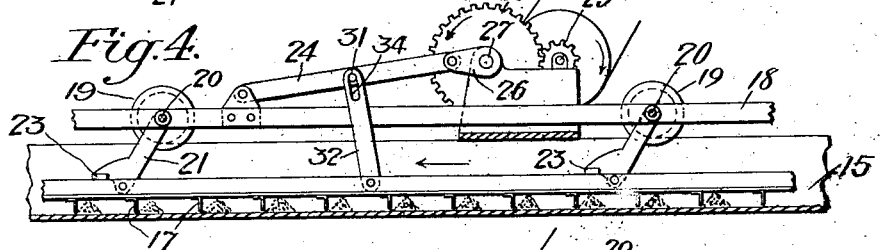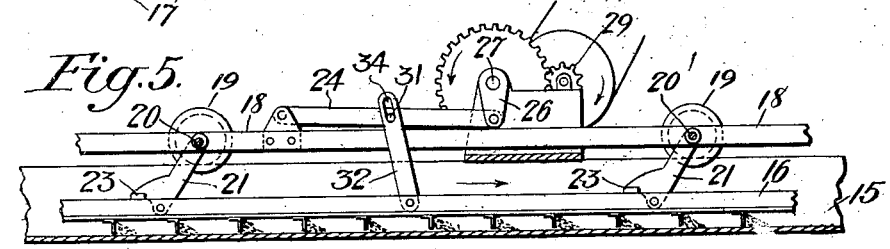

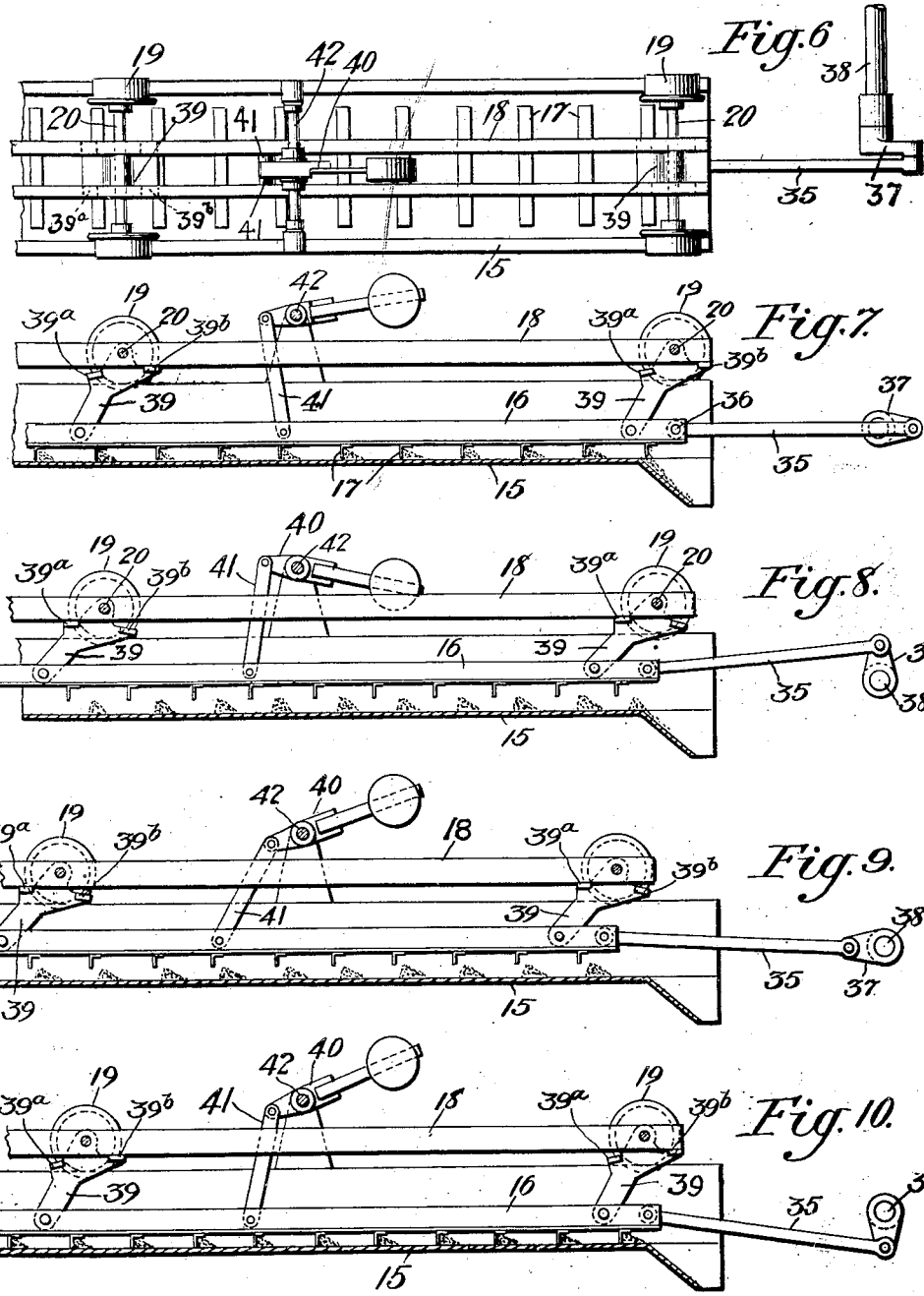

DAVID JACK NEVILL, OF DENVER, COLORADO.

STIRRER OR CONVEYER.

1,039,785. Specification of Letters Patent. Patented Oct. 1, 1912.

Application filed April 8, 1910. Serial No. 554,278.

*To all whom it may concern:*

Be it known that I, DAVID J. NEVILL, a citizen of the United States, residing at Denver, county of Denver, and State of Colorado, have invented certain new and useful Improvements in Stirrers or Conveyers; and I do hereby declare the following to be a full, clear, and exact description of the invention, such as will enable others skilled in the art to which it appertains to make and use the same.

This invention relates to conveyers or stirrers, and it has special reference to devices of this kind in which a body of material is pushed by means of a rake or similar element along a plate or trough.

The object of the invention is to furnish an improved and simplified device of this kind in which the rake is moved in an endless path or orbit, the lower run of which is substantially parallel to the trough bottom or other surface on which the material acted on is deposited.

More specifically the invention aims to provide a conveyer in the form of a jointed parallelogram, one member of which is constituted by a rake. This parallelogram is acted upon at one point by suitable operating mechanism that will effect a uniform working movement of the rake with respect to the trough regardless of the length of the apparatus. The operating mechanism may be connected with the parallelogram at one end of the latter, or intermediate of the ends of the same, or at other points, as convenience may require.

In the accompanying drawings: Figure 1 is a top plan view of a portion of a conveyer constructed in accordance with the invention, Figs. 2 to 5 inclusive are vertical longitudinal sections through the same, illustrating different stages of the operation, Fig. 6 is a top plan view of a conveyer of modified form, and Figs. 7 to 10 inclusive are vertical longitudinal sections of the conveyer shown in Fig. 6, illustrating different stages of the operation.

Referring to the drawings and more particularly to Figs. 1 to 5, 15 indicates a trough through which the material is to be fed, and 16 denotes a rake operating longitudinally of the trough. The specific construction of the rake 16 is immaterial, but in the embodiment shown it comprises parallel frame members from which depend transverse rake blades 17. At a point above the rake frame, which forms the lower member of the parallelogram, previously alluded to, is a frame 18, which forms the upper member of the parallelogram and rolls along the track formed by the sides of the trough, by means of wheels or rollers 19 mounted on opposite ends of transverse spindles 20 that are carried by said frame 18 at suitable points in the length thereof. The frame 18, like the rake frame 16, preferably comprises parallel side members, and the transverse spindles or axles 20 extend through the side members of the frame 18. The end members of the parallelogram are constituted by links 21, which are pivoted on the spindles or axles 20 and depend freely therefrom, between the side members of the upper frame 18, the lower extremities of said links projecting down between the side members of the rake frame and being pivoted to said members as indicated at 22. Intermediate of the ends of the links 21, the same are provided with suitable stops 23, which, by abutting against the rake frame prevent the latter from taking a position lower than that indicated in Fig. 2, wherein the links 21 are inclined and suspend the rake frame at such an elevation that the blades thereof are in close proximity to the trough bottom. Connected to the upper frame or member 18 at a point between the two pairs of wheels or rollers shown is a connecting rod 24 pivoted to a bracket 25 applied to the frame 18. The opposite end of said connecting rod is pivoted to a crank 26 carried by a shaft 27 to which rotation is imparted by a gear 28 meshing with a gear 29 on a power driven shaft 30. Intermediate of the ends of the connecting rod 24 the same carries a pin 31 which supports connecting links 32 pivoted at 33 to the rake frame 16. The links 32 are movable lengthwise with respect to the pin 31, being provided at their upper ends with longitudinal slots 34 through which said pin protrudes.

The operation of this form of the device is as follows:—Supposing the parts to be in the position shown in Fig. 2, wherein the rake frame is at the limit of its forward or conveying stroke, (toward the right), if the driving mechanism is driven as indicated by the arrows, the crank 26 will be raised into the position shown in Fig. 3. In the position shown in Fig. 2, no raising action on the rake frame is effected through the link connection 32 with the connecting rod 24, but in moving into the position shown in Fig. 3, said connecting rod raises the links 32 and thereby raises the rake frame 16, the entire parallelogram being simultaneously moved to the left through the turning of the crank 26 in that direction and the corresponding travel of the wheels 19 of the upper frame member along the track. In this way, the rake is raised up and moved back over the material in the trough without touching the same. On a further movement of the crank 27 in the same direction, the position indicated in Fig. 4 will be reached. In this figure, the crank 26 is directed horizontally and toward the left, and the rake is at the limit of its rearward stroke and about to commence its forward or pushing stroke, it having been lowered again into proximity to the trough bottom through the lowering of the connecting rod 24, as will be understood. Fig. 5 illustrates the parts at the intermediate portion of the forward or conveying stroke, in which position the rake frame 16 is supported solely from the upper wheeled frame member 18 by means of the links 21, the stops 23 of which hold the rake frame at the proper elevation, as will be manifest. A further quarter revolution of the crank 27 will cause the completion of the conveying stroke and bring the parts back to the position indicated in Fig. 2, wherein the rake is shown as about to rise and return over the material to begin another pushing impulse.

In the form illustrated in Figs. 6 to 10, the conveyer operates on substantially the same principle as that hereinbefore explained, but the operating mechanism acts on the end of the parallelogram instead of at an intermediate point. Said operating mechanism comprises a connecting rod 35 pivoted to the forward end of the rake 16, as indicated at 36, and also pivoted to a crank 37 of an operating shaft 38. The upper frame member 18 is provided with axles 20 and wheels 19 as before, but the arrangement of the links connecting the upper and lower frame members is somewhat modified. In this last construction the links 39, which are pivoted to the axles 20 and to the rake, as before indicated, are each provided with two stops $39^a$, $39^b$, which coact with the upper frame member 18 instead of with the rake frame. The stops $39^a$, $39^b$ are located at opposite sides of the links and each stop $39^a$ prevents the rake frame from moving upward beyond the position shown in Fig. 8, while each stop $39^b$ prevents the dropping of the rake frame below the position shown in Fig. 7. The rake frame 16 is counterweighted in this instance at a point intermediate of the wheeled axles. This is effected by connecting said rake with a counter weighted lever 40 by means of links 41, the lever 40 being pivoted at 42 to swing in a vertical plane.

The operation of this form of the conveyer will be readily understood from the foregoing description taken in connection with the disclosure of Figs. 7 to 10. Fig. 7 shows the rake at the limit of its forward or conveying movement, the connecting rod 35 being alined therewith. A movement of said connecting rod into the position shown in Fig. 8 will cause the stops $39^a$ of the links 39 to abut against the under surface of the upper frame member 18, whereupon said frame member will be rolled backward along the track afforded by the sides of the trough, with the rake above and out of contact with the material in the trough. Fig. 9 shows the parts when the rake has reached the limit of its return or rearward movement, and during further quarter revolution of the driving shaft 38, bringing the crank 37 into its lowermost position, the rake will be lowered so that its blades will travel parallel and in close proximity to the trough bottom, thereby beginning the forward or pushing movement, as shown in Fig. 10. In this position, the rake frame is sustained at the elevation indicated by the abutment of the stops $39^b$ against the under surface of the upper frame member of the parallelogram.

It is obvious that a counterbalancing device may be used in connection with the first form of conveyer described, as well as the second, and that the form of such device and its point of application are not material to the invention. It is also to be understood that the driving mechanism may act intermediate of the ends of the conveyer, as shown in Figs. 1 to 5, at one end of the same, as shown in Figs. 6 to 10, or at a number of points, as called for by conditions. Of course, the conveyer can be extended to any length, and the number of link members employed is immaterial. In short, I wish it to be understood that I have not attempted to illustrate and describe in this application all of the numerous modifications which fall within the scope of the invention.

What I claim is:—

1. In a conveyer, a longitudinally sliding upper member, a lower rake member, links pivotally connecting said members and equipped with stops carried by said links to limit the relative movement thereof, and means to cause the reciprocation of said upper member and the simultaneous raising and lowering of the rake member.

2. In a conveyer, a trough, a sliding member having wheels rolling on the upper edges of the trough, links pivoted to and depending from said sliding member, a rake frame pivoted to the lower ends of said links, stops on said links to limit the vertical movement of the rake frame with respect to the trough, and means to reciprocate said sliding member and simultaneously raise and lower the rake frame.

3. In a conveyer, the combination with a surface along which material is conveyed, of a wheeled member mounted to reciprocate above said surface, a rake frame coacting with said surface, links pivotally suspending the rake frame from said wheeled member, and operating means including a member attached directly to the rake frame, and by means of which the wheeled member is reciprocated and the rake frame is simultaneously raised and lowered, as described.

4. In a conveyer, the combination of a surface along which material is conveyed, a lengthwise reciprocating member mounted above said surface, a rake frame coacting with said surface and suspended from said member by means of pivoted links, stops carried by said links to limit the vertical movement of the rake frame with respect to said surface, and operating means for the device including a member connected directly with the rake frame to raise and lower the same as said first named member reciprocates.

5. In a conveyer, the combination with a trough along which material is conveyed, of a member having wheels traveling on the edges of said trough, a rake frame to coact with the trough bottom, links suspending said rake frame from said first named member and provided with stops carried by said links to limit the movement of the frame with respect to the trough, and operating means for the device including means to reciprocate said member and said rake frame lengthwise of the trough and to simultaneously raise and lower the rake frame.

In testimony whereof I affix my signature, in presence of two witnesses.

DAVID JACK NEVILL.

Witnesses:
JOHN K. JEFFREY,
CHAS. S. STONE.